United States Patent [19]
Dlugos et al.

[11] Patent Number: 5,808,912
[45] Date of Patent: Sep. 15, 1998

[54] METHOD FOR DIMENSIONAL WEIGHING UTILIZING POINT DETERMINATION

[75] Inventors: Daniel F. Dlugos; Earl B. Holtz, both of Shelton, Conn.

[73] Assignee: Pitney Bowes Inc., Stamford, Conn.

[21] Appl. No.: 775,672

[22] Filed: Dec. 31, 1996

[51] Int. Cl.⁶ .................................................. G06F 17/00
[52] U.S. Cl. .......................... 364/562; 364/560; 364/564; 705/407; 705/414
[58] Field of Search ..................................... 364/560–564, 364/567–568, 474.39, 464.1, 464.11, 464.12, 464.16, 464.17, 464.21, 464.24; 367/99, 107, 108, 110, 113, 115; 705/401, 402, 406, 407, 414, 410

[56] References Cited

U.S. PATENT DOCUMENTS

| | | | |
|---|---|---|---|
| 4,472,782 | 9/1984 | Suzuki | 364/474.37 |
| 4,528,651 | 7/1985 | Brock et al. | 367/99 |
| 4,866,643 | 9/1989 | Dutler | 364/474.37 |
| 5,042,015 | 8/1991 | Stringer | 367/99 |
| 5,105,392 | 4/1992 | Stringer et al. | 367/99 |
| 5,129,262 | 7/1992 | White et al. | 73/599 |
| 5,189,914 | 3/1993 | White et al. | 73/599 |
| 5,220,536 | 6/1993 | Stringer et al. | 367/99 |
| 5,331,118 | 7/1994 | Jensen | 177/25.14 |
| 5,446,798 | 8/1995 | Morita et al. | 382/154 |
| 5,528,517 | 6/1996 | Luken | 364/560 |
| 5,537,520 | 7/1996 | Doi et al. | 395/122 |

OTHER PUBLICATIONS

Three–Dimensional Object Recognition, P.J. Besl and R. C. Jain Mar. 1985.
Three–Dimensional Object Recognition, Session 7, Mitchell Nathan, University of 1987.

*Primary Examiner*—James P. Trammell
*Attorney, Agent, or Firm*—Melvin J. Scolnick; Robert H. Whisker; David E. Pitchenik

[57] ABSTRACT

The invention is a method for measuring the dimensions of a parcel through point determination which is initiated by placing a parcel on a weighing scale within a field of measurement which comprises a first known spatial relationship. In a preferred embodiment, an ultrasonic emitter is positioned at the outermost corner of the parcel. A sensor is placed on a line along each of the three axes ending at the outermost corner of the parcel; the lines representing the length, width, and height of the parcel and comprising the second known spatial relationship. The emitter transmits a pulse to the sensors. Each of the lines is then measured by determining a length of time from emission of the pulse to reception of the pulse by the sensors. The measurement data is transmitted to a data processing system which converts the time length of the pulse into a distance; a three dimensional graphical representation of the parcel, as determined by the first and second known spatial relationships, can then be displayed together with the calculated weight of the parcel. The calculated dimensions can then be transmitted to a parcel processing system. In an alternative embodiment, data points are determined by positioning an electronic pointer with respect to the parcel. Points are marked on the parcel with the pointer and are transmitted to the data processing system. A position for each of the points is recorded and plotted and the dimensions of the parcel can then be calculated and processed.

19 Claims, 7 Drawing Sheets

METHOD FOR DIMENSIONAL WEIGHING UTILIZING POINT DETERMINATION

RELATED APPLICATIONS

Reference is made to application Ser. No. 08/775,850, entitled APPARATUS AND METHOD FOR DIMENSIONAL WEIGHING UTILIZING A LASER SCANNER, assigned to the assignee of this application and filed on even date herewith.

Reference is made to application Ser. No. 08/775,673, entitled METHOD FOR DIMENSIONAL WEIGHING UTILIZING SPACED LINE PROJECTION, assigned to the assignee of this application and filed on even date herewith.

Reference is made to application Ser. No. 08/775,671, entitled METHOD FOR DIMENSIONAL WEIGHING WITH OPTICS, assigned to the assignee of this application and filed on even date herewith.

Reference is made to application Ser. No. 08/775,549, entitled LOW COST DIMENSIONAL DETERMINING SYSTEM, assigned to the assignee of this application and filed on even date herewith.

Reference is made to application Ser. No. 08/775,851, entitled COARSE VOLUME MEASUREMENT WITH INTERLOCK, assigned to the assignee of this application and filed on even date herewith.

Reference is made to application Ser. No. 08/775,675, entitled DIMENSIONAL WEIGHING APPARATUS assigned to the assignee of this application and filed on even date herewith.

Reference is made to application Ser. No. 08/775,550, entitled DIMENSIONAL WEIGHING UTILIZING A FOLLOWING ARM MECHANISM, assigned to the assignee of this application and filed on even date herewith.

Reference is made to application Ser. No. 08/775,214, entitled DIMENSIONAL WEIGHING UTILIZING A LINEAR DISPLACEMENT TRANSDUCER, assigned to the assignee of this application and filed on even date herewith.

Reference is made to application Ser. No. 08/775,213, entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674, entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

With increased competition among parcel and package carriers, there has been a great expansion of the services offered to shippers and in the calculation of shipping charges available to both the casual shipper and the high volume shipper. The challenge that shippers have thrown to carriers is to develop a scheme of charging for carrier services that is in accordance with the reality of how shippers actually need carriage services. The development of certain efficiencies of transport and materials handling together with electronic invoicing and parcel tracking, has created an environment where carriers are now able to offer shippers mixed modes of transport, overnight delivery, better tracking of parcel movement, and discount rates in return for the utilization of labor and cost saving measures such as: bar coding; bulk delivery; pre-sorting; and, dimensional weighing.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, truck, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by chutes, conveyors, rollers, or simply through human intervention with the occasional platform for weighing, measuring, or marking.

Dimensional determination is employed in various manners. U.S. Pat. No. 5,004,929 for an OPTICAL SYSTEM FOR DETECTING THREE-DIMENSIONAL SHAPE; issued Apr.2, 1991 to Kakinoki et al. (Kakinoki) is an example of dimensional determination designed to fit a specific need. In the case of Kakinoki, for instance, laser optics is employed to detect and measure a three dimensional shape. Kakinoki is important in its use of light power to compare images of items so that quality production can be maintained over a series of measured objects. If the images match, then the quality is maintained. Dimensional determination for shipping, however, is based on comparison of each object to be measured with a pre-existing but separate measuring standard. Kakinoki, on the other hand, compares each object being detected with other objects of its type, to determine a deviation.

U.S. Pat. No. 5,331,118 for a PACKAGE DIMENSIONAL VOLUME AND WEIGHT DETERMINATION SYSTEM FOR CONVEYORS, was issued Jul. 19, 1994 to Soren Jensen (Jensen). Jensen discloses a system for determining the dimensions of a parcel moving on a conveyor belt. The parcel passes over a strip with indicia indicating units of incremental measure to determine a width, and alongside a similar strip to determine height. The length of the parcel is determined by interrupting the path of a photo-electric eye. Weight is determined by using a weigh-in-motion conveyor scale. The Jensen disclosure provides a good example of how parcel handling is enhanced through the use of simple techniques that do not require a profusion of new hardware or cause parcel movement to be inefficient.

The use of sound has also been employed in several ways in making dimensional determinations. Long a staple of the Naval forces in locating ships, and now commonly utilized for identifying the location of schools of fish, sound waves can be readily measured to determine the location of points relative to a starting or neutral position. An example of the use of sound in determining the linear measurement of objects is U.S. Pat. No. 4,528,651, issued on Jul. 9, 1985 to Brock et al. (Brock). Brock teaches the measurement of objects, preferably cylindrical, by passing the objects through an array of transducers that perform echo ranging to determine length and diameter. Rectangularly shaped objects or parcels would be limited to only the measurements of length and height.

The ability to continuously monitor a field to be measured is known in the art; consider U.S. Pat. No. 5,325,178 for a METHOD OF MEASURING THE DIMENSIONS OF MOVING OBJECTS, issued on Jun. 28, 1994 to Louis et al. (Louis). Louis teaches that the length, width, and height of objects on a conveyor belt can be determined by utilizing fixed position CCD cameras to measure along predefined axes. The disadvantage to Louis is that the measuring devices (i.e., the CCD cameras) are sited along fixed lines, and therefore, objects of varied dimension can not be accurately measured.

Thus, an object of the present invention is to provide a cost effective means for determining the dimensions of a parcel. The ability of the shipper to enjoy reductions in rates from carriers by implementing certain efficiencies in operation, and to do so without slowing work flow or driving up costs, is a distinct advantage to be gained by the system user.

SUMMARY OF THE INVENTION

According to the invention, the object is achieved and the disadvantages of the prior art are overcome by a method for measuring the dimensions of a parcel through the utilization of point determination.

The first step of the method is to place a parcel on a flat surface within a field of measurement; the field of measurement comprising a first known spatial relationship. The flat surface of the field of measurement can be the weighing surface of a scale capable of determining the weight of the parcel. Then, one of two paths which represent preferred embodiments of the subject invention can be followed.

In path one, an ultrasonic emitter is positioned at the outermost corner of the parcel. The outermost corner is the corner nearest the system operator wherein three axes terminate to form the corner. An ultrasonic sensor is placed along each axis ending at the outermost corner of the parcel such that: a first of the sensors is placed at the end of the line formed by the parcel along an axis from the outermost corner; a second of the sensors is placed at the end of a second line formed by the parcel along a second axis from the outermost corner; and, a third sensor is placed at the end of a third line formed by the parcel along a third axis from the outermost corner. The three lines represent the length, width, and height of the parcel depending upon how the parcel was placed in the field of measurement; these dimensions represent the second known spatial relationship.

Once positioned, the emitter transmits a pulse from the ultrasonic emitter to the sensors. Each of the lines formed along each of the axes is measured by determining a length of time from emission of the pulse by the emitter to reception of the pulse by the corresponding sensor placed along each of the lines to be measured. The measurement data is transmitted to a data processing system and may also be displayed on a separate or remote monitor or display. The data processing system possesses means for converting the measured length of time of the pulse into a distance by utilizing a predetermined index of measurement.

Once the measured distance of the parcel is obtained, a three dimensional graphical representation of the parcel, as determined by the first known spatial relationship and by the second known spatial relationship, can be displayed on the system's display or monitor. The calculated weight of the parcel can be displayed as well. To use the data efficiently, the data processing system can transmit the calculated dimensions, including the weight, to a parcel processing system to prepare the parcel for shipment to its ultimate destination.

The second of the two preferred paths within the present invention requires the positioning of an electronic pointer with respect to the parcel. The pointer can be of a type produced by Pointer Systems Inc. of Burlington, Vt. 05401. Points are marked on the parcel with the pointer, such that each of the points marked is transmitted to the data processing system. A position for each of the points is recorded and plotted by the data processing system forming a plurality of dimensional planes from the recorded point positions wherein the planes are representative of the shape of the parcel. The data processing system can then calculate the dimensions of the parcel by measuring the dimensional planes.

The electronic pointer marks each of the points by making contact with a point on the surface of the parcel and a spatial relationship for that mark is then transmitted to the data processing system wherein the data processing system identifies each of the marked points within the field of measurement and then calculates a distance between the points within one or more sets of points. The calculation can be determined one of two ways; first, by counting pixels between points of the one or more sets of points if the points are to be displayed on a display or monitor of known pixel resolution; or, wherein the calculation is determined by recording the dimensions of the field of measurement and determining a distance between points as a second spatial relationship based upon the recorded dimensions of the field of measurement.

A unique degree of utility is added by the subject invention in that a three dimensional graphical representation of the parcel, as determined by the first and by the second spatial relationships, is displayed on a display or monitor.

The dimensional data determined through the measurement of the marked points can then be transmitted to a parcel processing system. It should be noted that the parcel processing system and the data processing system are preferably co-located.

DETAILED DESCRIPTION OF THE PREFERRED EMBODIMENTS

Figure 1:
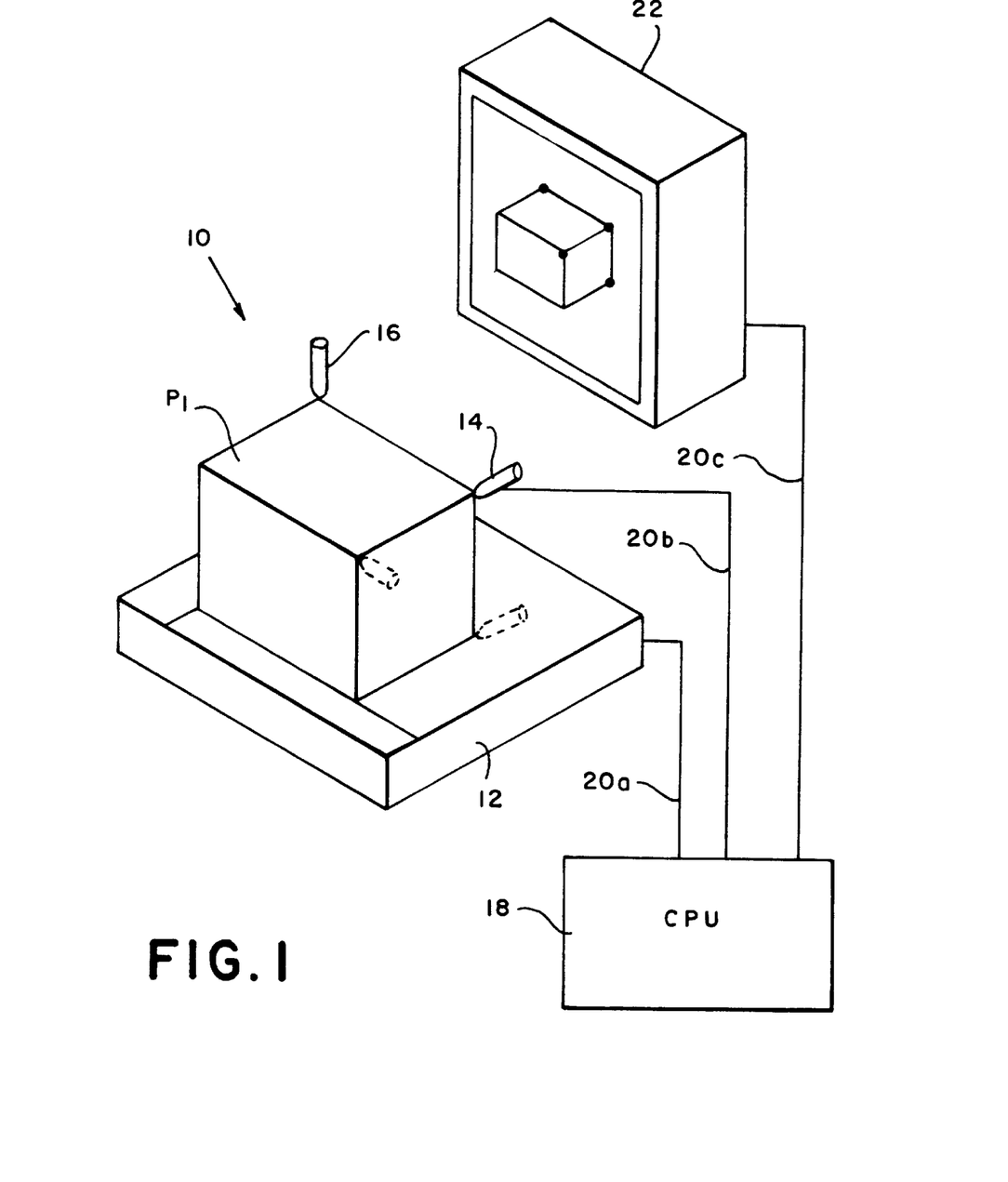
FIG. 1 is a diagram of a preferred embodiment of a system that could employ the invention method.

Turning to FIG. 1, there is shown a preferred embodiment of the present invention wherein a representative parcel P1 is placed on the surface of a platform 12 within a field of measurement designated as system 10. Platform 12 is preferably the surface of a weighing scale capable of calculating the weight of parcel P1 placed thereupon. Weight data is transmitted from weighing scale 12 to CPU 18 via interface cable 20a. An ultrasonic emitter 14, under control of CPU 18 via cable interface 20b, is placed at a corner of parcel P1 and an ultrasonic pulse of known duration and timing is emitted.

The pulse emitted from emitter 14 is received by ultrasonic receiver 16. Receiver 16 can be placed at any of the corners of parcel P1 so that the duration of the pulse can be measured to determine the length of the line from emitter to receiver. By changing the positions of emitter 14 and receiver 16, several two dimensional planes can be calculated by CPU 18 to construct a representation of parcel P1 to be displayed on display apparatus 22 which is connected to CPU 18 by interface cable 20c.

Figure 2:
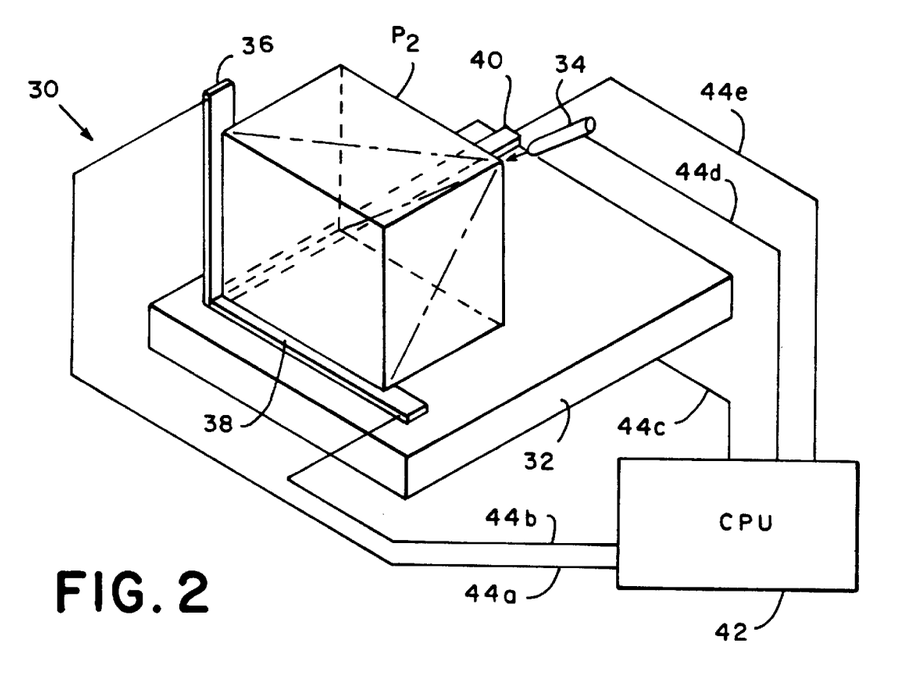
FIG. 2 is a diagram of an alternative embodiment of a system that could employ the invention method.

Turning to FIG. 2, there is shown an alternative embodiment of the present invention wherein a representative parcel P2 is placed on the surface of a platform 32 within a field of measurement designated as system 30. Platform 32 is preferably the surface of a weighing scale capable of calculating the weight of parcel P2 placed thereupon. Weight data is transmitted from weighing scale 32 to CPU 42 via interface cable 44c.

An ultrasonic emitter 34, under control of CPU 42 via cable interface 44d, is placed at a corner of parcel P2 and an ultrasonic pulse of known duration and timing is emitted.

The pulse emitted from emitter 34 is received by a series of ultrasonic receivers embedded in receiver arms 36, 38, and 40, each of which is in a fixed position on the surface of platform 32. Receiver arm 36 is in an upright position at one corner of platform 32 and serves as the height input to the calculation means of CPU 42. Received signals from emitter 34 are transmitted from receiver arm 36 along interface cable 44a to CPU 42. Receiver arm 38 is in a position at right angles to receiver arm 36 and alongside and parallel to one side of platform 32 and serves as the width input to the calculation means of CPU 42. Received signals from emitter 34 are transmitted from receiver arm 38 along interface cable 44b to CPU 42. Receiver arm 40 is in a position at right angles to receiver arm 36, at right angles to receiver arm 38, and alongside and parallel to one side of platform 32 and serves as the length input to the calculation means of CPU 42. Received signals from emitter 34 are transmitted from receiver arm 40 along interface cable 44e to CPU 42. Each of the three receiver arms 36, 38, and 40 have one end that meet to form a corner against which parcel P2 will be placed.

Figure 3:
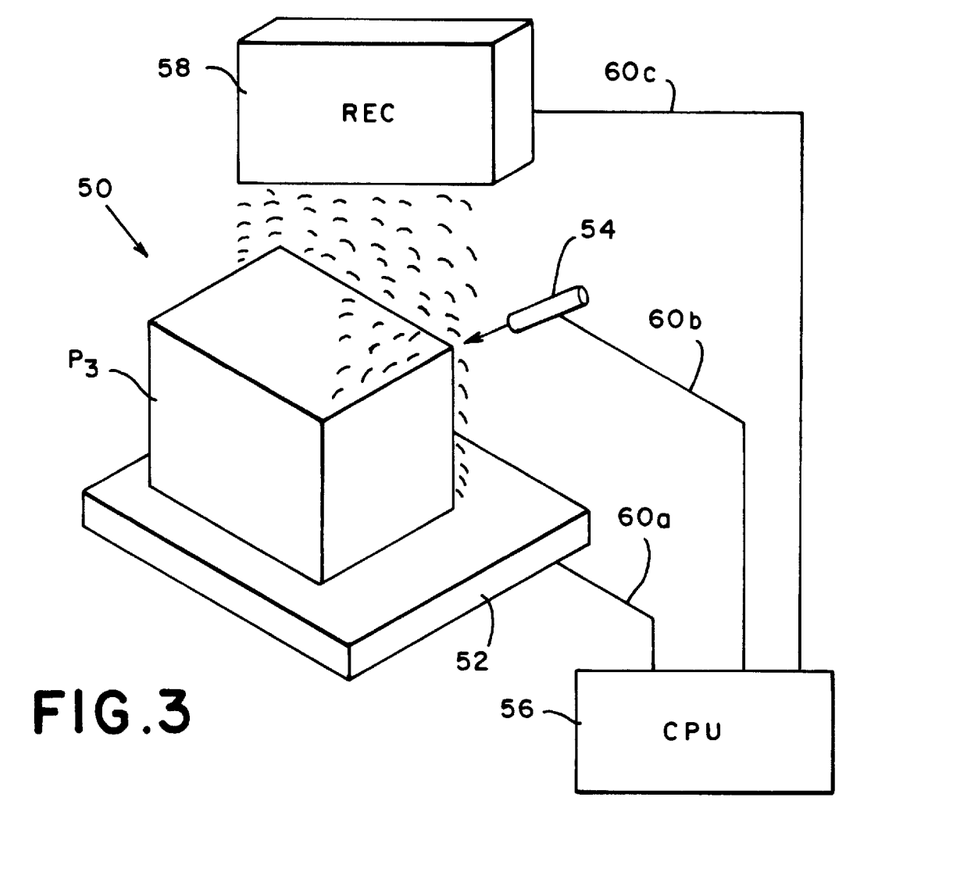
FIG. 3 is an alternative embodiment of the system of FIG. 2 wherein a single receiver is utilized to determine spatial relationship.

Turning to FIG. 3, there is shown an alternative embodiment of the present invention wherein a representative parcel P3 is placed on the surface of a platform 52 within a field of measurement designated as system 50. Platform 52 is preferably the surface of a weighing scale capable of calculating the weight of parcel P3 placed thereupon. Weight data is transmitted from weighing scale 52 to CPU 56 via interface cable 60a. An ultrasonic emitter 54, under control of CPU 56 via cable interface 60b, is placed at a corner of parcel P3 and an ultrasonic pulse of known duration and timing is emitted.

The pulse emitted from emitter 54 is received by ultrasonic receiver 58. Receiver 58 is placed above the field of measurement in a fixed position. The distance between the platform surface and the receiving sensors on the underside of ultrasonic receiver 58 is known by CPU 56. The duration of the pulse from emitter 54 to receiver 58 is transmitted to CPU 56 over interface cable 60c to be measured to establish a point of emission and for CPU 56 to determine the length of the line from emitter 54 to receiver 58. By changing the positions of emitter 54, a calculation of the dimensions of parcel P3 can be made by calculating means within CPU 56.

Figure 4A:
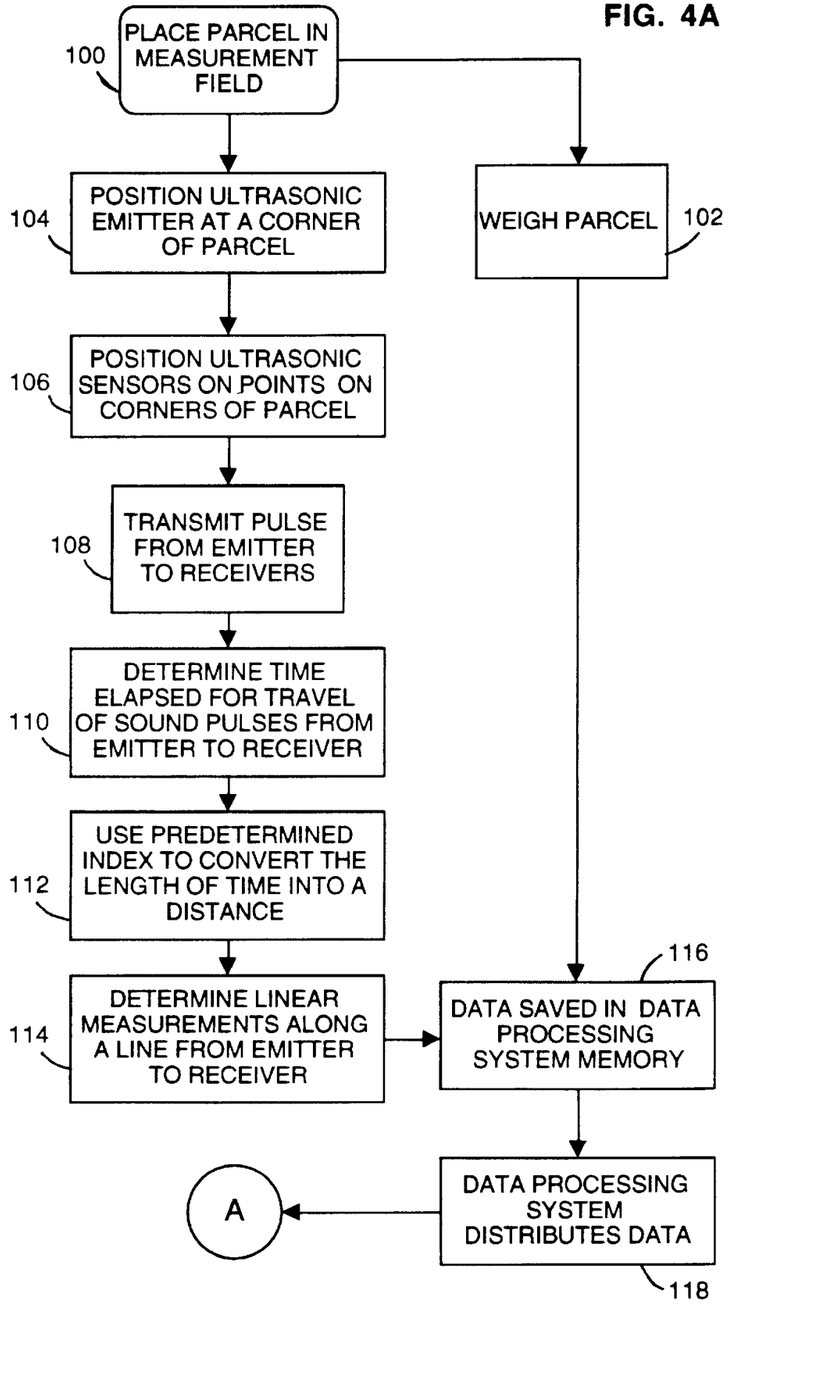
FIGS. 4A and 4B are a flowchart of the method of the present invention.
Figure 4B:
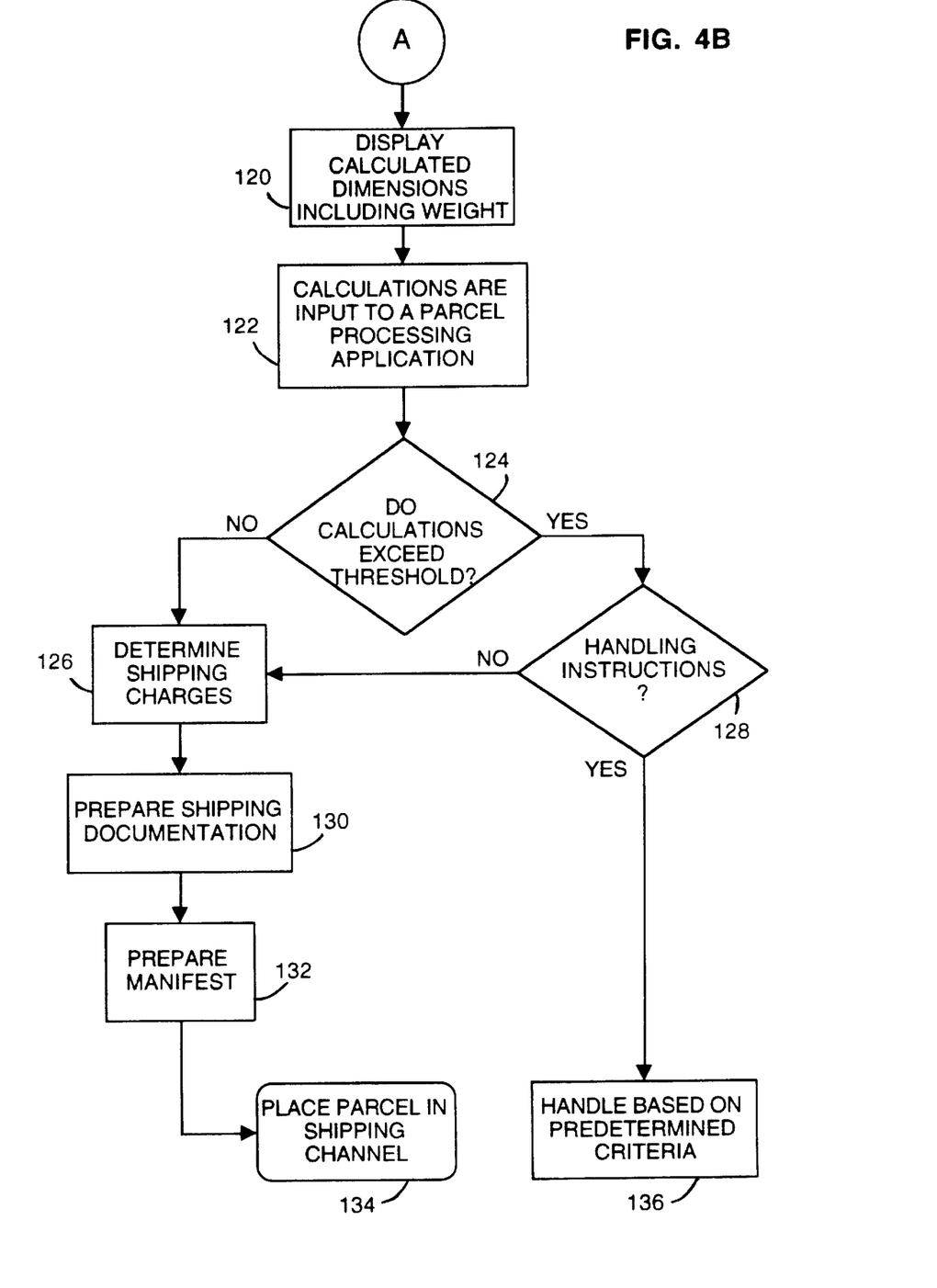

The processing steps of the embodiment described in FIG. 1 are shown in the flowchart of FIGS. 4A and 4B.

Turning to FIG. 4A, the method begins at step 100 when the parcel to be measured is placed on top of a platform within the field of measurement. From step 100, the method advances essentially simultaneously to steps 102 and 104. If the platform upon which the parcel has been placed is the surface of a weighing scale, then the weighing scale will determine the weight of the parcel at step 102 before advancing to step 116 where the weight data is stored in a memory of a data processing system. If the platform upon which the parcel has been placed is not the surface of a weighing scale, then the method will not perform step 102.

As the parcel is being weighed at step 102, or if the platform is not the surface of a weighing scale, the method performs step 104 where an ultrasonic emitter is placed on a corner of the parcel. The corner selected will serve as the starting point for measurement along the three baselines that emanate from the point and form the three dimensions of length, width and height. The corner from which the baselines diverge is designated position 0, 0 in a coordinate field and will be referred to hereinafter as the "neutral position."

The ultrasonic emitter emits a pulsed beam wherein the starting time and the gap between pulses is known. The neutral position is known by the CPU that processes the data being received by ultrasonic receiver such that an application program within the CPU will use the neutral position to begin to determine the linear dimensions of a parcel placed within the field of measurement.

From step 104, the method advances to step 106 where an ultrasonic receiver is placed on another corner of the parcel but on one of three straight lines along the edge of the parcel emanating from the neutral position; this point is designated R1. The corners of the parcel along the two remaining lines emanating from the neutral position are designated R2 and R3 respectively. This embodiment will assume the use of three ultrasonic receivers, one each at points R1, R2, and R3; though it is anticipated that one receiver could be utilized by moving the receiver from R1 through R2 and R3 and thus reducing the cost of the system. The method advances from step 106 to step 108.

At step 108, a pulsed signal under control of an application program within the CPU is transmitted from the emitter at the neutral position such that each of the receivers placed at positions R1, R2, and R3 can receive the signal. The received signal is converted to electronic data that is transmitted to the CPU for calculation of the time interval between the emission of the pulsed signal and its reception at each of the receivers. The method advances from step 108 to step 110.

At step 110, the CPU performs a determination of the time interval between emission and reception of the pulsed signals received from positions R1, R2, and R3, the method then advances to step 112. At step 112, the system converts the time calculations into a distance measurement by utilizing a lookup table with a pre-determined index of measurement. Step 112 advances to step 114 where the linear dimensions corresponding to the parcel's height, width, and length are determined.

The method advances from step 114 to step 116 where the calculations derived from the measurement of the parcel's length, width, height, and weight are stored within a memory of the CPU for subsequent use in a parcel processing application program. From step 116, the method advances to step 118 where the stored data is distributed, under control of the CPU's application program, to those applications requiring the data as input.

From step 118, the method advances along path A to re-enter the method flow at step 120 as shown in FIG. 4B. At step 120, the system displays the calculated dimensions and weight of the parcel to be processed. Essentially simultaneously to step 120, the calculations are input to a parcel processing program within the CPU at step 122 which applies the data against a look-up table of values that correspond to a shipping charge as determined by a carrier's dimensional weighing guidelines. From step 122, the method advances to a query at step 124 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 124 is "YES," then the method advances to a query at step 128 which asks if there are special handling instructions associated with a parcel corresponding to the measurements of the subject parcel. If the response to the query is "NO," then the method advances to step 126. If the response to the query at step 128 is "YES," however, then the method advances directly to step 136 where the parcel is further handled according to predetermined criteria which may include: rejection of the parcel by the carrier; alternate means of carriage; application of a different table of values for determining carriage charges; or, application of a service charge.

Returning to step 124, if the response to the query at step 124 is "NO," however, then the method advances to step 126 where shipping charges are determined in respect of the parcel's dimensions and any other criteria established within the application program's data table values. From step 126 the method advances to step 130 where the system prepares shipping documentation which might comprise: shipping labels; waybills; and appropriate barcoding. The method then prepares a carrier manifest, at step 132, indicative of parcels prepared for shipping. The method then advances to step 134 where the parcel is placed into its proper shipping channel.

Figure 5A:
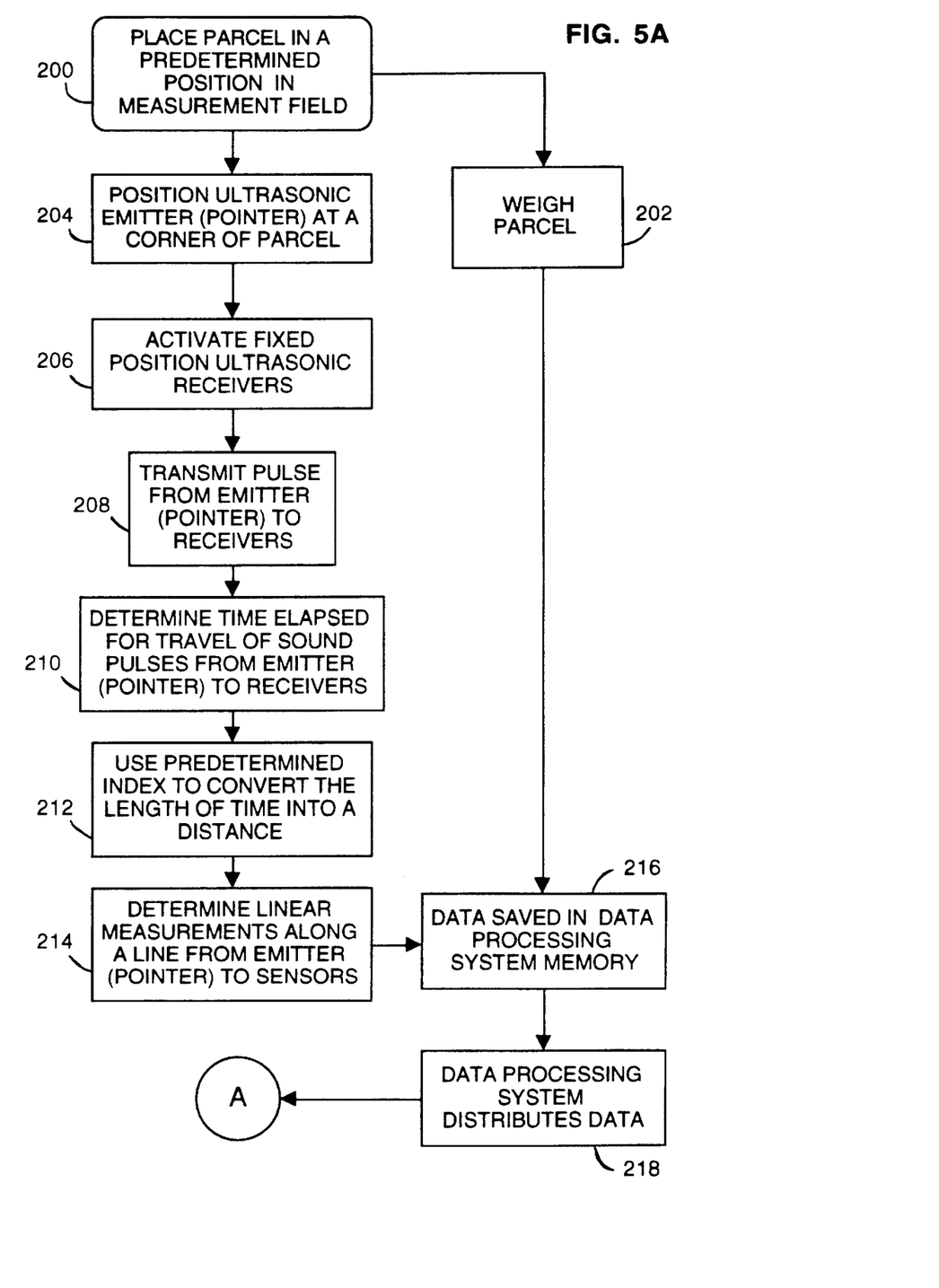
FIGS. 5A and 5B are a flowchart of an alternative embodiment of the method of the present invention.
Figure 5B:
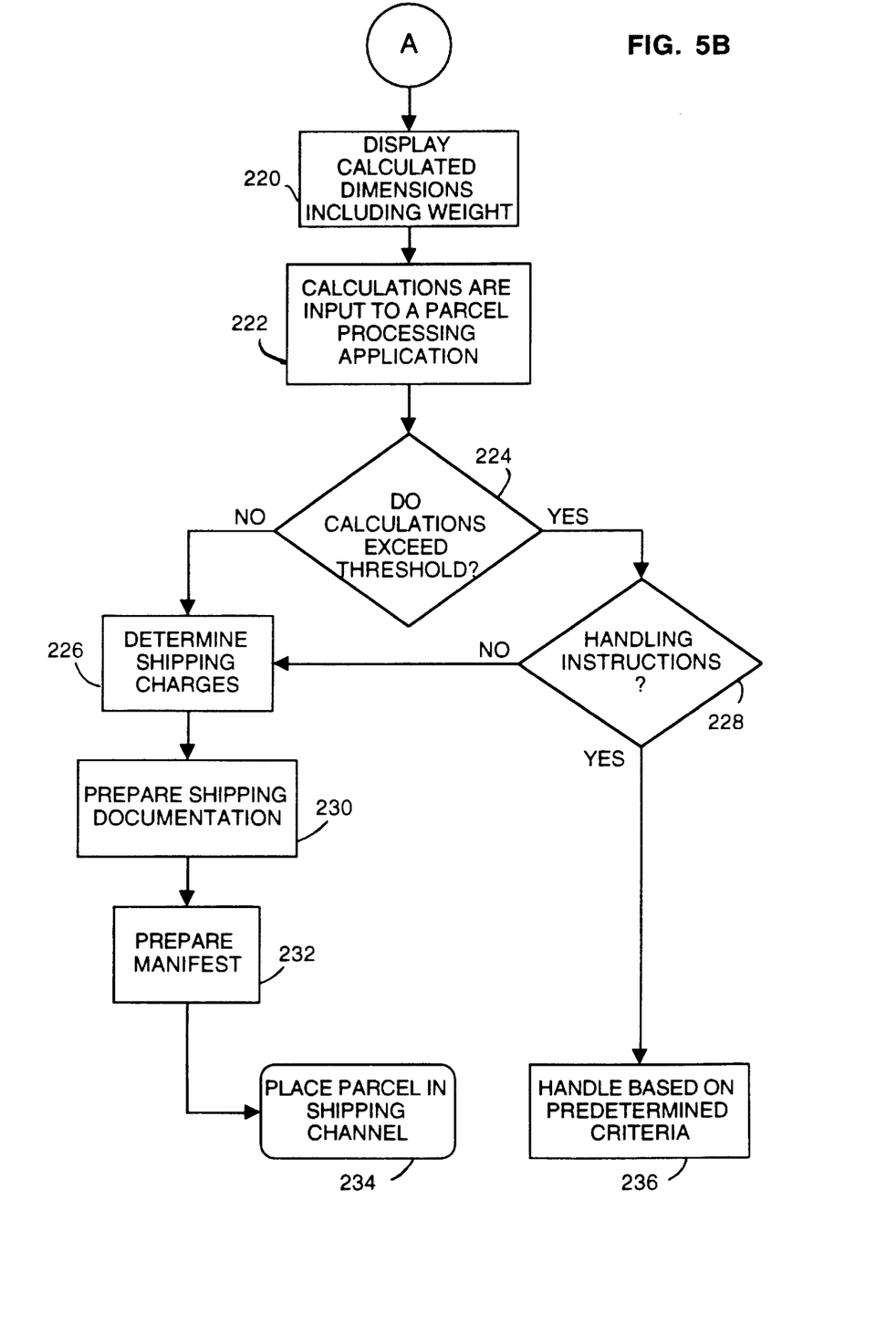

The processing steps of the embodiment described in FIGS. 2 and 3 are shown in the flowchart of FIGS. 5A and 5B.

Turning to FIG. 5A, the method begins at step 200 when the parcel to be measured is placed on top of a platform within the field of measurement. The field of measurement within the embodiments of FIGS. 2 and 3 differs from that of FIG. 1 in that the field of measurement contains ultrasonic receivers that are placed in a fixed position; therefore, the parcel to be placed for measurement must be placed in a pre-determined position so that the field of measurement has a known spatial relationship.

From step 200, the method advances essentially simultaneously to steps 202 and 204. If the platform upon which the parcel has been placed is the surface of a weighing scale, then the weighing scale will determine the weight of the parcel at step 202 before advancing to step 216 where the weight data is stored in a memory of a data processing system. If the platform upon which the parcel has been placed is not the surface of a weighing scale, then the method will not perform step 202.

As the parcel is being weighed at step 202, or if the platform is not the surface of a weighing scale, the method performs step 204 where an ultrasonic emitter is placed on a corner of the parcel. The corner selected will serve as the starting point for measurement along the three baselines that emanate from the point and form the three dimensions of length, width and height. The corner from which the baselines diverge is designated position 0, 0 in a coordinate field and will be referred to hereinafter as the "neutral position."

The ultrasonic emitter emits a pulsed beam wherein the starting time and the gap between pulses is known. The neutral position is known by the CPU that processes the data being received by ultrasonic receiver such that an application program within the CPU will use the neutral position to begin to determine the linear dimensions of a parcel placed within the field of measurement.

From step 204, the method advances to step 206 where a series of ultrasonic receivers are placed in a fixed position along two axes of the parcel that do not intersect the point where the ultrasonic transmitter is positioned. The parcel is placed in such a way as to make contact with the receivers but not to extend past them. In this way, the linear dimensions corresponding to height and width can be determined by measuring the signal strength reaching the exposed receivers from the emitter. The method advances from step 206 to step 208.

At step 208, a pulsed signal under control of an application program within the CPU is transmitted from the emitter at the neutral position such that each of the receivers can receive the signal. The received signal is converted to electronic data that is transmitted to the CPU for calculation of the time interval between the emission of the pulsed signal and its reception at each of the receivers. The method advances from step 208 to step 210.

At step 210, the CPU performs a determination of the time interval between emission and reception of the pulsed signals received, the method then advances to step 212. At step 212, the system converts the time calculations into a distance measurement by utilizing a lookup table with a predetermined index of measurement. Step 212 advances to step 214 where the linear dimensions corresponding to the parcel's height, width, and length are determined.

The method advances from step 214 to step 216 where the calculations derived from the measurement of the parcel's length, width, height, and weight are stored within a memory of the CPU for subsequent use in a parcel processing application program. From step 216, the method advances to step 218 where the stored data is distributed, under control of the CPU's application program, to those applications requiring the data as input.

From step 218, the method advances along path A to re-enter the method flow at step 220 as shown in FIG. 5B. At step 220, the system displays the calculated dimensions and weight of the parcel to be processed. The display can show a three-dimensional characterization of the parcel comprising a series of two dimensional planes that are derived from each of the points from which the emitter was placed relative to the fixed receivers. In the alternative, the display apparatus can simply display the dimensions of the parcel.

Essentially simultaneously to step 220, the calculations are input to a parcel processing program within the CPU at step 222 which applies the data against a look-up table of values that correspond to a shipping charge as determined by a carrier's dimensional weighing guidelines. In an alternative method of calculation, the dimensions of the parcel are displayed on the display apparatus based upon a predetermined scaling of the projected dimensional planes. The displayed parcel is converted to a linear measurement by counting the pixels between known points. Because the number of pixels in a display apparatus is known, the scale of values for determining linear measurements is based upon the same scale as that of the display apparatus. For instance, if a time interval is converted to a displayed line represented by 200 pixels, and the line is two inches long, then each inch of measurement can be broken down into values of $\frac{1}{100}$ of an inch.

From step 222, the method advances to a query at step 224 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 224 is "YES," then the method advances to a query at step 228 which asks if there are special handling instructions associated with a parcel corresponding to the measurements of the subject parcel. If the response to the query is "NO," then the method advances to step 226. If the response to the query at step 228 is "YES," however, then the method advances directly to step 236 where the parcel is further handled according to predetermined criteria which may include: rejection of the parcel by the carrier; alternate means of carriage; application of a different table of values for determining carriage charges; or, application of a service charge.

Returning to step 224, if the response to the query at step 224 is "NO," however, then the method advances to step 226 where shipping charges are determined in respect of the parcel's dimensions and any other criteria established within the application program's data table values. From step 226 the method advances to step 230 where the system prepares shipping documentation which might comprise: shipping labels; waybills; and appropriate barcoding. The method then prepares a carrier manifest, at step 232, indicative of parcels prepared for shipping. The method then advances to step 234 where the parcel is placed into its proper shipping channel.

As can be appreciated by those skilled in the art, a number of variations of the subject invention are possible. These variations include, but are not limited to: the use of a weighing scale as the platform within the field of measurement; the general abilities of the shipping system application utilized by the CPU; the shape or configuration of the platform for supporting the parcel or package to be measured; and, whether or not the system is a standalone system or a node within a network.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method for measuring the dimensions of a parcel, comprising the steps of:
   (a) placing a parcel on a flat surface, in a predetermined position, within a field of measurement, said field of measurement comprising a first known spatial relationship;
   (b) positioning an ultrasonic emitter at an outermost corner of said parcel wherein a plurality of parcel axes terminates at said outermost corner;
   (c) positioning a plurality of ultrasonic sensors on said parcel such that: a first of said plurality of sensors is placed at the end of a first line formed by said parcel along a first axis from said outermost corner; a second of said plurality of sensors is placed at the end of a second line formed by said parcel along a second axis from said outermost corner; and, a third of said plurality of sensors is placed at the end of a third line formed by said parcel along a third axis from said outermost corner;
   (d) transmitting a pulse from said ultrasonic emitter to said plurality of ultrasonic sensors;
   (e) measuring each of said lines formed along each of said axes by determining for each of said lines a length of time from emission of said pulse by said emitter to reception of said pulse by a corresponding sensor placed along each of said lines; and
   (f) converting said length of time into a distance by utilizing a predetermined index of measurement.

2. The method of claim 1, wherein said flat surface is the weighing surface of a scale capable of calculating a weight of said parcel.

3. The method of claim 1, wherein said first measured line formed along said first axis, said second measured line formed along said second axis, and said third measured line formed along said third axis comprise a second known spatial relationship comprising length, width, and height dimensions of said parcel; and, said length, width, and height are displayed on a display or monitor.

4. The method of claim 3, wherein a three dimensional graphical representation of said parcel, as determined by said first known spatial relationship and by said second known spatial relationship, is displayed on a display or monitor.

5. The method of claim 1, wherein said first measured line formed along said first axis, said second measured line formed along said second axis, and said third measured line formed along said third axis comprise length, width, and height dimensions of said parcel; and, said length, width, and height are transmitted to a parcel processing system.

6. The method of claim 2, wherein said calculated weight is displayed on a display or a monitor.

7. The method of claim 2, wherein said calculated weight is transmitted to a parcel processing system.

8. A method for measuring the dimensions of a parcel, comprising the steps of:
   (a) placing a parcel on a flat surface, in a predetermined position, within a field of measurement;
   (b) positioning an electronic pointer with respect to said parcel;
   (c) marking a plurality of points on said parcel with said electronic pointer, such that each of said plurality of points marked by said pointer is transmitted to a data processing system;
   (d) recording, at said data processing system, a position for each of said plurality of points;
   (e) forming, at said data processing system, a plurality of dimensional planes of said parcel from said recorded point positions; and
   (f) calculating, at said data processing system, said dimensions of said parcel by measuring said plurality of dimensional planes.

9. The method of claim 8, wherein said flat surface is the weighing surface of a scale capable of calculating a weight of said parcel.

10. The method of claim 8, wherein said electronic pointer marks said plurality of points by making contact with a point on the surface of said parcel and a first spatial relationship for said mark is transmitted to said data processing system wherein said data processing system identifies a plurality of points within said field of measurement and calculates a distance between one or more sets of said points.

11. The method of claim 10, wherein said calculation is determined by counting pixels between points of said one or more sets of points if said points were to be displayed on a display or monitor of known pixel resolution.

12. The method of claim 10, wherein said calculation is determined by recording the dimensions of said field of measurement and determining a distance between points as a second spatial relationship based upon said recorded dimensions of said field of measurement.

13. The method of claim 8, wherein said calculated dimensions of said planes comprising said parcel are displayed on a display or monitor.

14. The method of claim 12, wherein a three dimensional graphical representation of said parcel, as determined by said first and by said second spatial relationships, is displayed on a display or monitor.

15. The method of claim 8, wherein said calculated dimensions of said planes comprising said parcel are transmitted to a parcel processing system.

16. The method of claim 9, wherein said calculated weight is displayed on a display or a monitor.

17. The method of claim 9, wherein said calculated weight is transmitted to a parcel processing system.

18. The method of claim 15, wherein said parcel processing system and said data processing system are co-located.

19. The method of claim 17, wherein said parcel processing system and said data processing system are co-located.

* * * * *